United States Patent Office 3,678,002
Patented July 18, 1972

3,678,002
AMBIENT TEMPERATURE CURABLE SILICONE RUBBER COMPOSITIONS
Siegfried Nitzsche and Ernst Wohlfarth, Burghausen, Upper Bavaria, Germany, assignors to Wacker-Chemie G.m.b.H., Munich, Germany
No Drawing. Filed Oct. 19, 1970, Ser. No. 82,199
Int. Cl. C08f 21/01
U.S. Cl. 260—18 S                9 Claims

ABSTRACT OF THE DISCLOSURE

Room temperature curable silicone rubber stocks exhibiting improved reversion resistance after curing are prepared from mixtures of hydroxyl endblocked diorganopolysiloxanes, polyfunctional organosilicon compounds having at least three hydrocarbonoxy groups per molecule and metal salts of carboxylic acids wherein the salts are prepared from monocarboxylic acids containing 8 to 28 carbon atoms per molecule wherein the carboxyl group is bonded directly to a tertiary or quaternary carbon atom. The metal salts employed as catalysts are thus salts of acids of the general formula

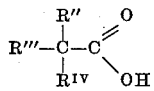

where $R''$ and $R'''$ are alkyl, aryl, alkenyl or aralkyl groups and $R^{IV}$ is hydrogen or an alkyl, aryl, alkenyl or aralkyl group, not more than 50% of the $R^3$ groups being hydrogen.

---

This invention relates to a room-temperature vulcanizable (RTV) silicone rubber stock which cures in deep section or in confined areas to give a reversion resistant product. More specifically, this invention introduces the use of metal salts of certain higher molecular weight carboxylic acids as catalysts for curing certain RTV silicone rubber stocks.

Many formulations and systems are known for preparing silicone rubber at temperatures below 100° C., particularly at room temperature. Thus, it is known from Canadian Pat. No. 816,214 issued June 24, 1969, that silicone elastomers can be prepared at room temperature by admixing hydroxyl-endblocked diorganopolysiloxanes, particularly α,ω-dihydroxydimethylpolysiloxanes, with silicon compounds having at least three hydrocarbonoxy radicals bonded to Si through C—O—Si linkage in each molecule as crosslinking agents and certain metal carboxylates as catalysts. The present invention is an improvement over the prior art based on the nature of the carboxylic acid salts of metals employed and the unexpected results achieved thereby.

It is the primary object of this invention to introduce a novel RTV silicone rubber stock exhibiting improved physical properties upon curing. Another and more specific object is to introduce novel curing catalysts for RTV silicone rubber stocks. A further object is to produce a cured silicone rubber which does not depolymerize when exposed to elevated temperatures in confined areas or in thick sections. Other objects and advantages of this invention will be obvious from the following disclosure.

It has been known to prepare organopolysiloxane elastomers by admixing hydroxyl-endblocked diorganopolysiloxanes with crosslinking agents which may be silicon compounds having at least three hydrocarbonoxy radicals bonded to silicon through C—O—Si linkages in each molecule, employing carboxylic acid salts of certain metals as catalysts, for example, dibutyltindilaurate, dioctyltinmaleinate or stannous-2-ethylhexoate. These mixtures cure at room temperature to form silicone elastomeric products but the products suffer a serious disadvantage in that when the cured rubber is in thick section or in a confined space and is exposed to heat, even as low as 80° C. but particularly 100° C. or above, the interior of the cured rubber becomes soft or fluid. This interior reversion is usually accompanied by a tackiness on the outer surface of the rubber.

Many attempts have been made to reduce or eliminate this reversion of the cured RTV silicone materials. Generally, such attempts involved adding further ingredients to the silicone rubber stock. One such additive was water but this proved to be effective only if the water could escape from the cured rubber while it was being heated. Thus, if the cured silicone rubber was in a confined area or was cured in thick section such that the water could not readily escape during heating, the reversion would occur at an accelerated rate. Other proposed additives to reduce or eliminate the noted reversion included certain metal oxides, for example, ferric oxide and titanium dioxide. These metal oxides have the disadvantage that they increase the viscosity of the uncured rubber stock to an undesirably high degree such that the uncured stock is difficult to work with. Also, the metal oxide additives act as pigments, coloring the stocks which may be undesirable and they alter the dielectric properties of the cured elastomers.

It is also known that a careful heat cure schedule following the initial vulcanization of silicone rubber stock can reduce the reversion effect noted above. However, such heat tempering is expensive and time consuming, thus, adding to the cost of the product. Further, the heat cure or heat tempering is not always successful for silicone rubber in confined areas or exposing only a small area of the cured rubber and in many cases such after cure heat tempering could not be carried out because the rubber is incorporated into an article which cannot be subjected to such a heat cure schedule.

The above noted difficulties are avoided and a RTV silicone rubber stock which exhibits little or no reversion when exposed to heat is obtained by the method of this invention.

This invention introduces a novel room-temperature vulcanizing silicone rubber stock consisting essentially of (1) a hydroxyl-endblocked diorganopolysiloxane, (2) a silicon compound containing at least three hydrocarbonoxy radicals bonded to silicon through C—O—Si linkage in each molecule, and (3) a carboxylic acid salt of a metal wherein the carboxylic acid is a monocarboxylic acid containing 8 to 28 carbon atoms per molecule and exhibiting branching on the aliphatic carbon atom in the alpha position to the carboxyl group, at least 50% of the number of carbon atoms in the alpha position to the carboxyl group being quaternary carbon atoms.

The base diorganopolysiloxanes employed herein are the well-known α,ω-dihydroxydiorganopolysiloxanes, widely described in the RTV silicone rubber literature (see, e.g., U.S. Pats. No. 2,843,555 and No. 3,127,363, as well as Canadian Pat. No. 816,214). These polymers are generally defined by the formula

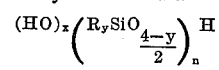

where R is a monovalent hydrocarbon radical or substituted hydrocarbon radical, $x$ has an average value of 0.99 to 1.01, $y$ has an average value of 1.99 to 2.01, $x+y$ is 3, and $n$ is an integer of at least 3 and preferably at least 50. These polymers are linear and diorganosiloxane units predominate but limited proportions of $RSiO_{3/2}$ units, $R_3SiO_{1/2}$ units and $SiO_{4/2}$ units may be present but should not exceed 2 mol percent of the units present.

The organic substituents represented by R in the above formulae and bonded to silicon through C—Si bonding include the same radicals previously outlined in the art for such polymers. Thus, the organic substituents can be alkyl radicals such as methyl, ethyl, isopropyl and octadecyl; alkenyl radicals such as vinyl, allyl, hexenyl and octadecenyl; cycloalkyl and cycloalkenyl radicals such as cyclohexyl and cyclohexenyl radicals; aryl radicals such as phenyl, xenyl and naphthyl radicals; aralkyl radicals such as benzyl and phenylethyl radicals; and alkaryl radicals such as tolyl and o-, m- and p-ethylphenyl radicals. Substituted hydrocarbon radicals such as halogenated derivatives of the foregoing radicals, e.g. trifluorovinyl, perfluoroalkylethyl such as $CF_3CH_2CH_2$— and $CF_3CF_2CH_2CH_2$— o-, p- and m-chlorophenyl radicals and $\alpha,\alpha,\alpha$-trifluorotolyl radicals as well as cyanoalkyl radicals such as $\beta$-cyanoethyl and gamma-cyanopropyl radicals are also represented by R.

Preferably the organic substituents represented by R contain 1 to 48 carbon atoms with those hydrocarbon groups having 1 to 8 carbon atoms being most preferred. It is preferred that the R groups in alpha-position to the silicon atom are not double bonded. The R groups bonded to any one silicon atom can be alike or different, thus, homopolymers, copolymers and mixtures thereof can be employed herein. Because of commercial availability and cost factors, it is preferred that at least 50 percent of the R groups should be methyl radicals. The remaining R groups are preferably selected from phenyl and vinyl radicals. The viscosity of the hydroxyl-endblocked diorganopolysiloxane is not critical but it is preferred to employ polymers having viscosities in the range from 10 cs. to $10 \times 10^6$ cs. at 25° C.

The crosslinking agents employed herein are silanes and siloxanes having at least three hydrocarbon radicals bonded to silicon through Si—O—C linkage per molecule. These are the same crosslinking agents heretofore known for such use wherein the functional groups are hydrocarbonoxy radicals. Preferably, the crosslinking agent is fluid at 20° C./760 mm. Hg. Particularly useful are silicates defined by the formula $Si(OR')_4$ where R' is as above defined for R and partial hydrolyzates of such silicates generally described as polysilicates, particularly those partial hydrolyzates having at least 0.5 R'O— groups per silicon atom. Also operable are silanes of the general formula $RSi(OR')_3$ and $HSi(OR')_3$ as well as partial hydrolyzates of such silanes containing at least three R'O— groups per molecule and preferably containing at least 0.5 R'O— groups per silicon atom and siloxanes such as $R_3SiO(R_2SiO)_mSi(OR')_3$, $(R'O)_3SiO(R_2SiO)_mSi(OR')_3$ and $(R'O)_pR_qSiO(R_2SiO)_mSiR_{q'}(OR')_{p'}$ where $p+q$ is 3, $p'+q'$ is 3 and $p+p'$ is at least 3, $m$ is 0 to 20 and R and R' are as above defined. Mixtures of crosslinking agents as defined above can be employed if desired.

The organic substituents represented by R' include and are exemplified by those monovalent hydrocarbon and substituted hydrocarbon radicals set forth above defining R. In addition, the radicals represented by R' may contain oxygen in the form of ether linkages as in $R(OCH_2CH_2)_a$— where R is as above defined and $a$ is 1, 2 or 3 as exemplified by $CH_3OCH_2CH_2$—, $CH_2H_5OCH_2CH_2$— and $C_2H_5(OCH_2CH_2)_2$—.

The crosslinking silicon compounds containing the defined R'O— groups are employed in amounts of from 0.1 to 15% by weight, particularly 0.5 to 5.0% by weight, based on the weight of the mixture.

The third required ingredient in the mixture is the catalyst which can be any of certain metal salts of certain carboxylic acids. The metal cations of the salts can be any of those metals previously known for such catalysis. These metals include tin, lead, zirconium, zinc, manganese, antimony, iron, cobalt, nickel, chromium, cadmium, calcium and barium. The metal cation in the operative salts can be substituted by organic radicals bonded to the metal through a carbon-metal linkage in the same way as in the metal-carboxylic acid salts previously employed for RTV elastomers based on hydroxyl-endblocked diorganopolysiloxanes with silicate - type crosslinking agents as described above. Thus, the catalysts include monoorganometalcarboxylates, diorganometalcarboxylates and triorganometalcarboxylates as well as the metalcarboxylates per se.

The monocarboxylic acids from which the anions of the salts employed herein are derived are those wherein the carboxyl group is bonded directly to a tertiary or quaternary carbon atom. These monocarboxylic acids can be represented by the general formula

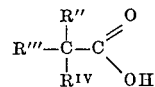

In this formula, R'' and R''' are alkyl, aryl, alkaryl or aralkyl radicals of less than 19 carbon atoms and $R^{IV}$ is an alkyl, aryl, alkaryl or aralkyl radical of less thn 19 carbon atoms or a hydrogen atom, not more than 50% of the substituents represented by $R^{IV}$ being hydrogen atoms. The radicals represented by R'', R''' and $R^{IV}$ or any two of them can be connected together to form ring structures. The alkyl groups can be linear, branched or cyclic. In order to achieve a particularly strong reduction of the rubber reversion, however, not more than 50% of R'', R''' and $R^{IV}$ radicals should be cyclic or form parts of cyclics. For example, because of their ready availability, the preferred monocarboxylic acid salts are those containing 8 to 28 carbon atoms per molecule and particularly those containing 9 to 11 carbon atoms per molecule. Pure acids can be employed but mixtures of carboxylic acids are more common and operate very well in this invention.

The monocarboxylic acids from which the anions of the salts employed as catalysts in the present invention are derived are known compounds (cf. British Pat. No. 939,483 and Canadian Pat. No. 673,595). They can be prepared, for example, by reacting monoolefins with carbon monoxide and water in the presence of acid catalysts such as borontrifluoride. A mixture of various branched monocarboxylic acids from which the salts of the present invention can be prepared is available commercially under the trade name "Versatic Acids 911" (the name "Versatic" being a registered trademark). The monocarboxylic acids in this commercial mixture have 9 to 11 carbon atoms per molecule. The carboxyl group in 90% by weight of this mixture of acids is tertiary, thus, 90% of the number of carbon atoms in alpha position to the carboxyl group are quaternary carbon atoms and are bonded secondarily in 10% by weight of the acid mixture. In general, the acid molecules in this mixture contain at least one methyl radical represented by R'', R''' or $R^{IV}$.

Examples of salts which can be employed herein include stannous acylate, lead acylate, cobalt acylate, zinc acylate, iron acylate, chromium acylate, carbomethoxyphenyltintriacylate, isobutyltintriacylate, cyclohexenylleadtriacylate, xenylleadtriacylate, dimethyltindiacylate, dibutyltindiacylate, divinyltindiacylate, diisoamyltindiacylate, diphenylleaddiacylate, dicyclopentylleaddiacylate, dibenzylleaddiacylate, diallylleaddiacylate, triethyltinacylate, tributyltinacylate, triphenyltinacylate, tricyclohexyltinacylate, tritolyltinacylate, tri-n-propylleadacylate, tristearylleadacylate and trinaphthylleadacylate, where the acylate group is always derived from an acid containing 8 to 28 carbon atoms and particularly those acids containing 9 to 11 carbon atoms.

The salts employed herein are prepared in accordance with well-known procedures. For example, the salts can be prepared by reacting a metal oxide or organometaloxide with a monocarboxylic acid branched at an aliphatic carbon atom in the alpha position to the carboxyl group.

The metal salts of monocarboxylic acids employed herein as catalysts are preferably incorporated in quantities of from 0.01 to 10% by weight, preferably 0.1 to 5% by weight based on the total weight of the mixture.

In addition to the three required ingredients employed herein, other materials can also be incorporated in the RTV silicone rubber stocks of the present invention. Organic solvents may be employed such as ethylacetate, methylethylketone, chlorinated aliphatic hydrocarbon solvents, chlorinated aromatic hydrocarbon solvents, aliphatic and aromatic hydrocarbon solvents, reinforcing and non-reinforcing fillers, pigments, soluble dyes, corrosion inhibitors, oxidation inhibitors, aromatics, heat stabilizers, resins, plasticizers and softeners such as fluid trimethylsiloxy endblocked dimethylpolysiloxanes and alpha-hydroxy, omega-trimethylsiloxy-dimethylpolysiloxanes. If some of the Si—C bonded organic radicals in the diorganopolysiloxane base polymer are alkenyl or alkynyl groups, particularly vinyl or allyl radicals, the use of an organic peroxide in quantities of 0.01 to 5% by weight based on the weight of base diorganosiloxane polymer is advantageous.

The above noted additives are well documented in the art and are employed in the usual proportions herein. Thus, among the reinforcing fillers which may be used and exhibit a surface area of 50 m.$^2$/gram or higher, one can mention fume silicas, silica aerogels and precipitated silicas, all of which may be pretreated in accordance with known techniques. Non-reinforcing fillers useful herein include diatomaceous earth, calcium silicates, zirconium silicates, titania, molecular sieves, calcium carbonate, glass powder, glass frit, glass fibers and such organic fillers as polyvinylchloride powder and powdered polytetrafluoroethylene. Fibrous fillers such as asbestos can also be used. All of the noted fillers may have organosiloxy or alkoxy groups on the surface as a result of pretreatment. Mixtures of fillers can be used. The filler can best be employed in amounts of from 5 to 90% based on the total weight of organopolysiloxane and filler.

The compositions of this invention can be prepared by any desired method. It is suggested to mix the ingredients at room temperature and normal pressure but variations in temperature and pressure during mixing can be used if desired. The compositions can be used as encapsulants and insulation for electrical and electronic components and motors, for preparing molded articles, molds, impressions, coatings including linings for plaster molds, insulations and for all other purposes for which silicone elastomers and particularly RTV elastomers have heretofore been employed.

The following examples are included to further illustrate the invention and aid those skilled in the art to practice the invention. The scope of the invention is defined in the claims and is not limited by the examples.

EXAMPLE 1

(A) A mixture was prepared employing 300 g. of a mixture of 2 parts by weight hydroxyl-endblocked dimethylpolysiloxane having a viscosity of 20,000 cs. at 25° C. and 1 part by weight of quartz flour, 9 grams of hexaethoxydisiloxane, and 3 grams of di-n-butyltindiacylate wherein the acylate groups are derived from a commercially available mixture of monocarboxylic acids containing 9 to 11 carbon atoms per molecule and wherein 90% of the acids are bonded tertiarily (Verstic® Acid 911). The mixture was poured into cylindrical molds with an inside diameter of 60 mm. After 24 hours at room temperature, the mixture had cured to an elastomeric article and was removed from the mold and placed in an oven at 150° C. The molded articles remained unchanged after 12 hours heating at 150° C.

(B) As a control for comparison purposes, the procedure (A) was repeated except 3 grams of di-n-butyltindilaurate replaced the 3 grams of di-n-butyltindiacylate employed in (A). The vulcanized molded articles so obtained were heated in an oven at 150° C. and after 12 hours, the articles were fluid except for a few mm. layer of outer skin which was tacky. Thus, the interior of the molded article in (B) had suffered severe reversion.

EXAMPLE 2

(A) A mixture was prepared from 100 grams of a mixture of 1 part by weight of hydroxyl endblocked dimethylpolysiloxane having a viscosity of 15,000 cs. at 25° C. and 1 part by weight of quartz flour, 3 grams hexaethoxydisiloxane, and 1 gram of the dibutyltindiacylate employed as the curing catalyst as in Example 1(A). The mixture was poured into steel cylinders open at the top and having an inside diameter of 30 mm. and a height of 20 mm. After 24 hours at room temperature, the mixture had vulcanized to an elastomeric product and the steel cylinders were closed and heated for 12 hours at 150° C. in an oven. The elastomer within the cylinders remained unchanged after this heating cycle.

(B) For comparison purposes, the above procedure was repeated except the curing catalyst employed was 1 gram of pure crystalline di-n-butyltindilaurate. After 24 hours, the mixture had cured to an elastomer and the steel cylinder was closed and heated at 150° C. for 12 hours in an oven as in (A) above. After this confined heat treatment, the elastomer had reverted and was almost completely fluid.

(C) For further comparison, the procedures of (A) and (B) was repeated employing 1 gram of commercial, fluid di-n-butyltindilaurate as curing catalyst. The heat treatment at 150° C./12 hours in the closed cylinder resulted in complete reversion of the elastomer to a fluid material.

EXAMPLE 3

(A) A mixture was prepared employing 300 grams of a mixture of 2 parts by weight of hydroxyl endblocked dimethylpolysiloxane having a viscosity of 21,000 cs. at 25° C., and 1 part by weight of diatomaceous earth with 9 grams of hexa-n-propoxydisiloxane and 3 grams of a crosslinking catalyst which is di-2-ethylhexyltindiacylate, wherein the acylate groups are derived from a commercially available mixture of monocarboxylic acids having 9 to 11 carbon atoms per molecule, 90% of the acids being bonded tertiarily. The mixture was placed in a cylindrical mold having an inside diameter of 60 mm. After 24 hours in the mold at room temperature, the mixture had vulcanized to form an elastomeric product. The elastomeric product was placed in an oven at 150° C. for 12 hours and the interior of the product was slightly softened by such heating.

(B) For purposes of comparison, the above procedure was repeated employing 1 gram of di-2-ethylhexylmaleinate as the curing catalyst in place of the di-2-ethylhexyltindiacylate. After 24 hours vulcanization and 12 hours at 150° C. in the oven, the molded articles were fluid on the inside.

EXAMPLE 4

Equivalent results were achieved when Example 1(A) was repeated employing in place of the dimethylpolysiloxane 300 g. of any one of the following: a copolymer of 50 mol percent $(CH_3)_2SiO$ units and 50 mol percent $CH_3(C_6H_5)SiO$ units having OH endblockers and a viscosity of 1,000,000 cs. at 25° C.; a copolymer of 90 mol percent $(CH_3)_2SiO$ units and 10 mol percent $CH_2=CH(CH_3)SiO$ units having —OH endblockers and a viscosity of 150,000 cs. at 25° C.; a copolymer of 60 mol percent $(CH_3)_2SiO$ units, 15 mol percent $(C_6H_5)_2SiO$ units, 15 mol percent $(CH_3)(C_6H_5)SiO$ units and 10 mol percent $CF_3CH_2CH_2(CH_3)SiO$ units having —OH endblockers and a viscosity of 5000 cs. at 25° C.; or a mixture of 50 weight percent HO[(CH$_3$)$_2$SiO]$_{100}$H, 40 weight percent HO[(CH$_3$)$_2$SiO]$_{90}$[(C$_6$H$_5$)$_2$SiO]$_{10}$[CH$_2$=CH(CH$_3$)SiO]$_5$H and 10 weight percent (CH$_3$)$_3$SiO[(CH$_3$)$_2$SiO]$_{100}$Si(CH$_3$)$_2$OH

EXAMPLE 5

Equivalent results were achieved when Example 1(A) was repeated employing in place of the 3 grams of di-n-butyltindiacylate 3 grams of any of the following or mixtures thereof: stannous acylate, lead acylate, cobalt acylate, zinc acylate, iron acylate, chromium acylate, carbomethoxyphenyltintriacylate, isobutyltintriacylate, dibutyltindiacylate, tributyltin acylate, cyclohexenylleadtriacylate and trinaphthylleadacylate, wherein the acylate anion is derived from a mixture of branched monocarboxylic acids containing 8 to 28 carbon atoms.

That which is claimed is:

1. A room-temperature vulcanizable silicone rubber stock prepared by admixing (1) a hydroxyl-endblocked diorganopolysiloxane of the general formula

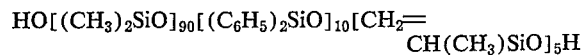

wherein each R is a monovalent hydrocarbon or substituted hydrocarbon radical of 1 to 18 carbon atoms bonded to silicon through Si—C bonding, $x$ has an average value of 0.99 to 1.01, $y$ has an average value of 1.99 to 2.01, $x+y$ has a value of 3, $n$ has a value of at least 3, said polymer having a viscosity not exceeding $10\times 10^6$ cs. at 25° C., (2) a crosslinking agent which is a silicon compound containing at least three hydrocarbonoxy radicals per molecule bonded to silicon through C—O—Si linkage and (3) a catalyst which is a metal salt of a monocarboxylic acid wherein the metal cation is selected from tin, lead, zirconium, zinc, manganese, antimony, iron, cobalt, nickel, chromium, cadmium, calcium and barium and the monocarboxylic acid anion is derived from an acid of the general formula

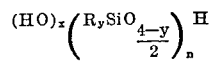

where R'' and R''' are selected from the group consisting of alkyl, aryl, alkenyl and aralkyl radicals and R$^{IV}$ is a hydrogen atom, alkyl, aryl, alkenyl or aralkyl radical, not more than 50% of the R$^{IV}$ radicals being hydrogen atoms, said monocarboxylic acid containing 8 to 28 carbon atoms per molecule.

2. The silicone rubber stock of claim 1 wherein the curing catalyst is a salt of a mixture of monocarboxylic acids containing 9 to 11 carbon atoms per molecule and wherein at least 90 percent by weight of the acid is bonded tertiarily.

3. In a method for preparing room-temperature vulcanizing silicone rubber stocks based on a base polymer which is an essentially linear hydroxyl-endblock diorganopolysiloxane and a crosslinking agent based on silicon compounds containing at least three alkoxy or alkoxyalkoxy groups per molecule, the improvement consisting of employing as a curing catalyst a metal salt of a monocarboxylic acid containing 8 to 28 carbon atoms per molecule and branched to the carboxyl group by an aliphatic carbon atom in the alpha position, at least 50 percent of the number of carbon atoms in alpha position to the carboxyl group being quaternary carbon atoms, the metal cation in said salt being tin, lead, zirconium, zinc, manganese, antimony, iron, cobalt, nickel, chromium, cadmium, calcium or barium.

4. The method of claim 3 wherein the carboxylic acid anion in the catalyst is derived from an acid of the general formula

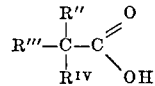

where R'' and R''' are alkyl, aryl, alkenyl or aralkyl radicals, up to 50% of the R$^{IV}$ radicals are hydrogen atoms and 50 to 100% of the R$^{IV}$ radicals are alkyl, aryl, alkenyl or aralkyl radicals.

5. The method of claim 3 wherein the base polymer is a hydroxyl-endblocked diorganopolysiloxane of 10 cs. to $10\times 10^6$ cs. viscosity at 25° C. wherein at least 50% of the organic substituents are methyl radicals, any remaining organic substituents being selected from the group consisting of vinyl and phenyl radicals.

6. The method of claim 3 wherein the crosslinking agent is a silane of the formula RSi(OR')$_3$ or HSi(OR')$_3$ or a partial hydrolyzate of such silanes having 2 to 20 silicon atoms per molecule where R is a monovalent hydrocarbon radical and R' is a monovalent hydrocarbon radical.

7. The method of claim 3 wherein the crosslinking agent is a siloxane containing 2 to 20 silicon atoms, at least 3 substituents on the silicon atoms in each molecule being OR' groups where R' is a monovalent hydrocarbon radical of 1 to 18 carbon atoms and the remaining substituents on silicon being monovalent hydrocarbon radicals of 1 to 18 carbon atoms and oxygen atoms present as Si—O—Si linkages.

8. The silicone rubber stock of claim 1 also containing (4) a filler.

9. The method of claim 3 wherein the silicone rubber stock contains a filler.

References Cited

UNITED STATES PATENTS 2,843,555  7/1958  Berridge _____ 260—18
3,419,516  12/1968  Tarno _____ 260—37

DONALD E. CZAJA, Primary Examiner

M. I. MARQUIS, Assistant Examiner

U.S. Cl. X.R.

260—31.2 R, 32.8 SB, 33.6 SB, 33.8 SB, 37 SB, 46.5 G, 825, 827